United States Patent
Li et al.

(10) Patent No.: US 12,078,816 B2
(45) Date of Patent: Sep. 3, 2024

(54) GRATING COLLIMATOR, BACKLIGHT SYSTEM, AND METHOD EMPLOYING A LIGHT-RECYCLING LIGHT SOURCE

(71) Applicant: LEIA INC., Menlo Park, CA (US)

(72) Inventors: Xuejian Li, Menlo Park, CA (US);
Ming Ma, Palo Alto, CA (US); David A. Fattal, Mountain View, CA (US)

(73) Assignee: LEIA Inc., Menlo Park, CA (US)

( * ) Notice: Subject to any disclaimer, the term of this patent is extended or adjusted under 35 U.S.C. 154(b) by 710 days.

(21) Appl. No.: 17/168,108

(22) Filed: Feb. 4, 2021

(65) Prior Publication Data
US 2021/0157160 A1 May 27, 2021

Related U.S. Application Data

(63) Continuation of application No. PCT/US2018/046562, filed on Aug. 13, 2018.

(51) Int. Cl.
*G02B 27/30* (2006.01)
*G02B 5/02* (2006.01)
*G02B 27/44* (2006.01)

(52) U.S. Cl.
CPC ........... *G02B 27/30* (2013.01); *G02B 5/0252* (2013.01); *G02B 27/44* (2013.01)

(58) Field of Classification Search
CPC ............ G02B 27/0101; G02B 27/0081; G02B 27/0172; G02B 27/30; G02B 27/44;
(Continued)

(56) References Cited

U.S. PATENT DOCUMENTS 7,223,005 B2   5/2007   Lamb et al.
7,527,412 B2   5/2009   Lee et al.
(Continued)

FOREIGN PATENT DOCUMENTS

CA   3108060 A1   2/2020
CA   3108060 C    1/2024
(Continued)

OTHER PUBLICATIONS

International Search Report and Written Opinion (ISRWO) by International Searching Authority (ISA) Korean Intellectual Property Office (KIPO) dated May 13, 2019 (14 pages) for counterpart PCT Application No. PCT/US2018/046562.
(Continued)

*Primary Examiner* — Sultan Chowdhury
(74) *Attorney, Agent, or Firm* — Schwegman Lundberg & Woessner, P.A.

(57) ABSTRACT

A grating collimator and backlight system provide collimated light to illuminate a backlight. The grating collimator includes a light guide configured to guide light as guided light and a light-recycling light source configured to provide light to the light guide and to recycle light received from the light guide. The grating collimator further includes a diffraction grating coupler configured to diffractively redirect the provided light into the light guide as the guided light. The backlight system includes the grating collimator configured to provide collimated output light and the backlight configured to receive the collimated output light. The backlight may be multiview backlight.

17 Claims, 5 Drawing Sheets

(58) Field of Classification Search
CPC .. G02B 27/425; G02B 5/0236; G02B 5/0252; G02B 5/0282; G02B 6/0013; G02B 6/0016; G02B 6/0031; G02B 6/0035; G02B 6/0066

See application file for complete search history.

(56) References Cited

U.S. PATENT DOCUMENTS

| | | | |
|---|---|---|---|
| 7,976,204 | B2 | 7/2011 | Li et al. |
| 8,384,861 | B2 | 2/2013 | Jepsen |
| 9,088,790 | B2 | 7/2015 | Kim et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,484,674 | B2 | 11/2019 | Fattal |
| 10,788,619 | B2 | 9/2020 | Fattal |
| 10,928,677 | B2 | 2/2021 | Aieta et al. |
| 2005/0201122 | A1 | 9/2005 | Shinohara et al. |
| 2007/0291491 | A1 | 12/2007 | Li et al. |
| 2008/0266863 | A1 | 10/2008 | Rinko |
| 2008/0297696 | A1 | 12/2008 | Banerjee |
| 2009/0040426 | A1 | 2/2009 | Mather et al. |
| 2011/0002143 | A1 | 1/2011 | Saarikko et al. |
| 2011/0051460 | A1 | 3/2011 | Montgomery et al. |
| 2011/0141395 | A1 | 6/2011 | Yashiro |
| 2011/0141765 | A1 | 6/2011 | Chang et al. |
| 2011/0286236 | A1 | 11/2011 | Kanade et al. |
| 2012/0127751 | A1 | 5/2012 | Kimmel |
| 2012/0188791 | A1 | 7/2012 | Voloschenko et al. |
| 2014/0268867 | A1 | 9/2014 | Fiorentino et al. |
| 2015/0036068 | A1* | 2/2015 | Fattal .............. G02F 1/133615 362/606 |
| 2015/0268399 | A1* | 9/2015 | Futterer ............ G02B 6/0076 362/606 |
| 2016/0047522 | A1 | 2/2016 | Weekamp et al. |
| 2016/0161659 | A1 | 6/2016 | Minami et al. |
| 2016/0170126 | A1 | 6/2016 | Sasaki |
| 2016/0202594 | A1 | 7/2016 | Kim et al. |
| 2017/0269279 | A1 | 9/2017 | Wyatt |
| 2017/0299794 | A1 | 10/2017 | Fattal |
| 2018/0024289 | A1 | 1/2018 | Fattal |
| 2018/0157042 | A1* | 6/2018 | Wall ................. G02B 27/0172 |
| 2018/0164489 | A1 | 6/2018 | Fattal et al. |
| 2018/0164490 | A1 | 6/2018 | Ma et al. |
| 2018/0172893 | A1 | 6/2018 | Fattal et al. |
| 2018/0299608 | A1 | 10/2018 | Fattal et al. |
| 2019/0155105 | A1* | 5/2019 | Aieta .................. G02B 6/0036 |
| 2019/0170926 | A1 | 6/2019 | Fattal et al. |
| 2019/0196091 | A1 | 6/2019 | Li et al. |
| 2019/0339647 | A1* | 11/2019 | Kim .................... G02B 6/0031 |

FOREIGN PATENT DOCUMENTS

| | | |
|---|---|---|
| CN | 1914528 A | 2/2007 |
| CN | 102588845 B | 7/2012 |
| CN | 203799043 U | 8/2014 |
| CN | 104469341 A | 3/2015 |
| CN | 105308387 A | 2/2016 |
| CN | 107533255 A | 1/2018 |
| CN | 108027532 A | 5/2018 |
| CN | 112534337 A | 3/2021 |
| EP | 3837579 A1 | 6/2021 |
| JP | 2003115209 A | 4/2003 |
| KR | 20150031626 A | 3/2015 |
| TW | 201243408 A | 11/2012 |
| TW | 201619672 A | 6/2016 |
| TW | 201802511 A | 1/2018 |
| WO | 9833006 A2 | 7/1998 |
| WO | WO-2017204840 A1 | 11/2017 |
| WO | WO-2018047388 A1 | 3/2018 |
| WO | WO-2020036587 A1 | 2/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

"Canadian Application Serial No. 3,108,060, Office Action mailed Feb. 11, 2022", 3 pgs.

"Canadian Application Serial No. 3,108,060, Office Action mailed Nov. 25, 2022", 5 pgs.

"Canadian Application Serial No. 3,108,060, Response filed Mar. 13, 2023 to Office Action mailed Nov. 25, 2022", 10 pgs.

"Canadian Application Serial No. 3,108,060, Response filed Jun. 10, 2022 to Office Action mailed Feb. 11, 2022", 28 pgs.

"Canadian Application Serial No. 3,108,060, Voluntary Amendment mailed Jan. 28, 2021", 24 pgs.

"Canadian Application Serial No. 3,108,060, Voluntary Amendment mailed Aug. 11, 2023", 25 pgs.

"Chinese Application Serial No. 201880096435.7, Decision of Rejection mailed Jan. 10, 2023", W/English Translation, 17 pgs.

"Chinese Application Serial No. 201880096435.7, Office Action mailed Mar. 7, 2022", W/English Translation, 22 pgs.

"Chinese Application Serial No. 201880096435.7, Office Action mailed May 17, 2023", W/English Translation, 25 pgs.

"Chinese Application Serial No. 201880096435.7, Office Action mailed Sep. 2, 2022", W/English Translation, 18 pgs.

"Chinese Application Serial No. 201880096435.7, Office Action mailed Oct. 30, 2023", W/English Translation, 20 pgs.

"European Application Serial No. 18930370.4, Extended European Search Report mailed Feb. 22, 2022", 13 pgs.

"European Application Serial No. 18930370.4, Intention to Grant mailed Jan. 30, 2024", 5 pgs.

"European Application Serial No. 18930370.4, Response filed Aug. 18, 2022 to Extended European Search Report mailed Feb. 22, 2022", 18 pgs.

"European Application Serial No. 18930370.4, Response to Communication pursuant to Rules 161(2) and 162 EPC filed Aug. 25, 2021", 18 pgs.

"International Application Serial No. PCT/US2018/046562, International Preliminary Report on Patentability mailed Feb. 25, 2021", 10 pgs.

* cited by examiner

GRATING COLLIMATOR, BACKLIGHT SYSTEM, AND METHOD EMPLOYING A LIGHT-RECYCLING LIGHT SOURCE

CROSS-REFERENCE TO RELATED APPLICATIONS

This application is a continuation application of and claims the benefit of priority to prior International Application No. PCT/US2018/046562, filed Aug. 13, 2018, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To address various potential applicability limitations of passive displays associated with light emission, many passive displays are coupled to an external light source. The coupled light source may allow these otherwise passive displays to emit light and function substantially as an active display. Examples of such coupled light sources are backlights.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments in accordance with the principles described herein provide a grating collimator configured to provide a collimated source of illumination along with a backlight system configured to receive collimated light from the grating collimator. In particular, a grating collimator is provided that includes a light guide, a light-recycling light source, and a diffraction grating coupler. The light guide is configured to guide light as guided light at a non-zero propagation angle relative to a plane of a guiding surface of the light guide. The guided light has a propagation direction toward an output of the grating collimator. The light-recycling light source is configured to provide light to the light guide and to recycle light received from the light guide. The light recycled by the light-recycling light source is configured to augment the provided light. The diffraction grating is at a guiding surface of the light guide and is configured to diffractively redirect the light provided by the light-recycling light source into the light guide as the guided light at the non-zero propagation angle. The diffractively redirected light may exit the grating collimator as collimated output light, according to various embodiments.

According to various embodiments, the collimated output light from the grating collimator may be coupled into a light guide of a backlight used in an electronic display. In some embodiments, the electronic display may be a three-dimensional (3D) or multiview electronic display used to display 3D information, e.g., as a 3D or multiview image. For example, the electronic display may be an autostereoscopic or 'glasses free' multiview or 3D electronic display. In other embodiments, the electronic display may be a two-dimensional (2D) display.

In particular, a multiview display may employ a backlight to provide illumination of a multiview image being displayed by the multiview display. For example, the backlight may comprise a plurality of multibeam elements configured to provide directional light beams corresponding to pixels of the multiview display (or equivalently of the multiview image). In various embodiments, the directional light beams may have different principal angular directions (also referred to as 'the differently directed light beams') from one another. According to some embodiments, these differently directed light beams produced by the backlight may be modulated and serve as multiview pixels corresponding to different views of the multiview display. In these embodiments, the light collimation provided by the grating collimator may be used to produce collimated light within the backlight. Similarly, the 2D display may employ a backlight to provide illumination of a 2D image being displayed. However, the backlight of the 2D display may provide diffuse or substantially diffuse or non-directional illumination.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, the 'multiview display' is defined as an electronic display or display system configured to provide different views of a multiview image in or from different view directions. In particular, the different views may represent different perspective views of a scene or object of the multiview image.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a bar guide and a strip guide.

Further herein, the term 'bar' when applied to a light guide as in a 'bar-shaped light guide' is defined as a three-dimensional rectilinear column, which is sometimes referred to as a 'bar' guide. Thus, 'bar-shaped' light guide has a generally three-dimensional columnar shape, by definition. In particular, a bar-shaped light guide is defined as a light guide configured to guide light along a length bounded by two pairs of opposing surfaces aligned in two substantially orthogonal directions (e.g., a top surface and a bottom surface, and two side surfaces of the light guide). Further, a dimension orthogonal to the length of either of the two pairs of opposing sides (e.g., a width or a height) is less than the length of the light guide, by definition. According to various embodiments, a first pair of opposing surfaces (e.g., the top and bottom surfaces) of the bar-shaped light guide is substantially parallel to one another in at least a differential sense. Similarly, two other generally opposing sides (e.g., opposite sides) are also substantially parallel to one another in at least a differential sense, according to various embodiments. That is, within any differentially small region or length of the bar-shaped light guide, opposing surfaces (e.g., top and bottom surfaces, a pair of side surfaces, etc.) are substantially parallel to one another.

According to various embodiments described herein, a diffraction grating may be employed to scatter or couple light into a light guide (e.g., a grating collimator) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array of features. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light source, the provided diffraction or diffractive scattering may result in, and thus be referred to as, 'diffractive coupling' in that the diffraction grating may couple light into the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light source, the diffraction grating may also diffractively couple the light from light source into the light guide.

Further, by definition herein, the features of a diffraction grating are referred to as 'diffractive features' and may be one or more of at, in and on a surface (i.e., wherein a 'surface' refers to a boundary between two materials). The surface may be a surface of a grating collimator, for example. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. If the diffraction grating comprises parallel grooves, parallel ridges, etc. at a side surface, the diffraction grating comprises 'vertical' diffractive features that are parallel to one another (i.e., parallel vertical diffractive features), by definition herein. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

Herein, a 'light source' is defined as a source of light (e.g., an apparatus or device) that emits light when activated. A light source herein may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color. In some embodiments, the light source comprises a polychromatic light emitting diode configure to provide white light.

Herein by definition, a light-recycling light source is a light source that is configured to both provide light and recycle any light returned to it, such as by reflection. The light returned to the light-recycling light source may then be recycled and added to the light that is already provided by the light-recycling light source, according to various embodiments.

By definition herein, a 'multibeam element' is a structure or element of a backlight or a display that produces light that includes a plurality of directional light beams. In some embodiments, the multibeam element may be optically coupled to a light guide of a backlight to provide the light beams by coupling out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam element. In some embodiments, the multibeam element may be considered an 'extended point source', i.e., a plurality of point light sources distributed across an extent of the multibeam element, by definition herein.

Herein, the 'size' may be defined in any of a variety of manners to include, but not be limited to, a length, a width or an area. For example, the size of the multibeam element may be a length of the multibeam element. In another example, size may refer to an area of the multibeam element. In some embodiments, the size of the multibeam element is comparable to a size of a light valve used to modulate directional light beams of the plurality of directional light beams. As such, the multibeam element size may be comparable to a light valve size when the multibeam element size is between about fifty percent (50%) and about two hundred percent (200%) of the light valve size. For example, if the multibeam element size is denoted 's' and the light valve size is denoted 'S', then the multibeam element size s may be given by equation (1) as:

$$\tfrac{1}{2}S \leq s \leq 2S \quad (1)$$

In other examples, the multibeam element size is greater than about sixty percent (60%) of the light valve size, or greater than about seventy percent (70%) of the light valve size, or greater than about eighty percent (80%) of the light valve size, or greater than about ninety percent (90%) of the light valve size, and the multibeam element is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. For example, the multibeam element may be comparable in size to the light valve size where the multibeam element size is between about seventy-five percent (75%) and about one hundred fifty percent (150%) of the light valve size. In another example, the multibeam element and light valve may be comparable in size where the multibeam element size is between about one hundred twenty-five percent (125%) and about eighty-five percent (85%) of the light valve size. According to some embodiments, the comparable sizes of the multibeam element and the light valve may be chosen to reduce, or in some examples to minimize, dark zones between views of the multiview display, while at the same time reducing, or in some examples minimizing, an overlap between views of the multiview display.

Further, as used herein, the article 'a' is intended to have its ordinary meaning in the patent arts, namely 'one or more'. For example, 'a light beam' means one or more light beams and as such, 'the light beam' means 'the light beam(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the terms 'substantially' and 'about,' as used herein, mean a majority, or almost all, or all, or an amount within a range of about 51% to about 100%. Moreover, examples herein are intended to be illustrative only and are presented for discussion purposes and not by way of limitation.

Figure 1A:
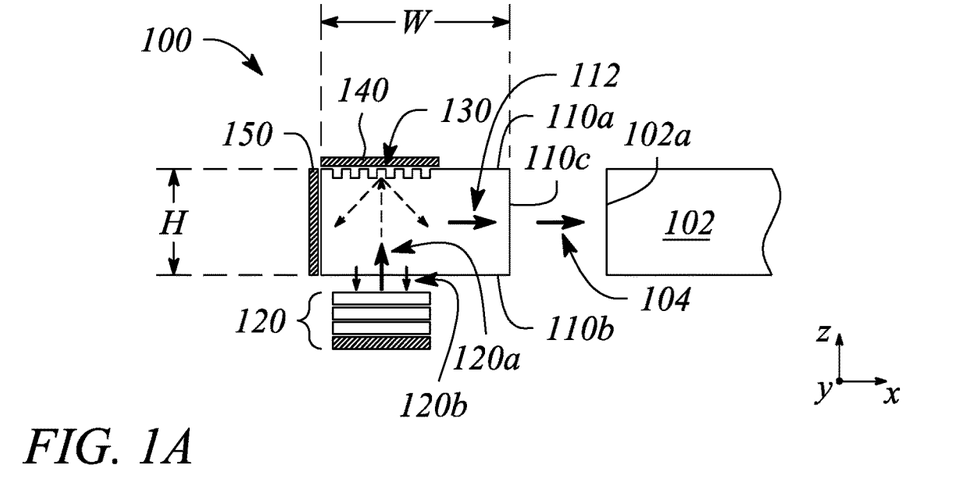
FIG. 1A illustrates a cross sectional view of a grating collimator in an example, according to an embodiment consistent with the principles described herein.
Figure 1B:
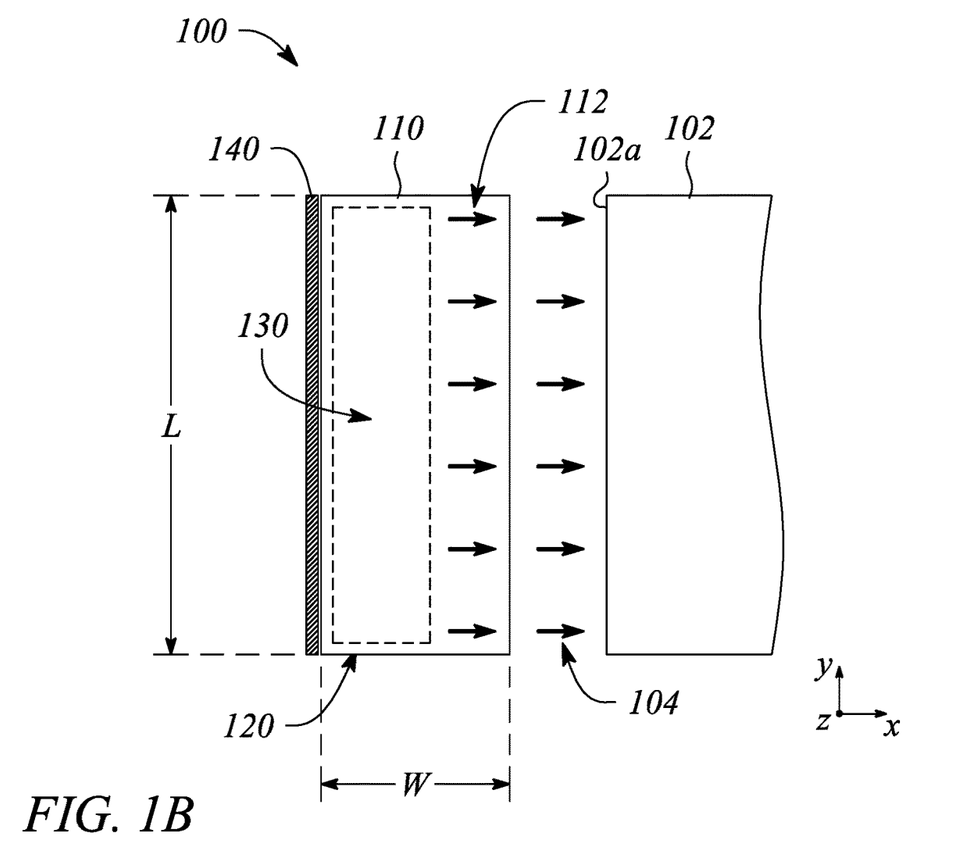
FIG. 1B illustrates a plan view of a grating collimator in an example, according to an embodiment consistent with the principles described herein.
Figure 1C:
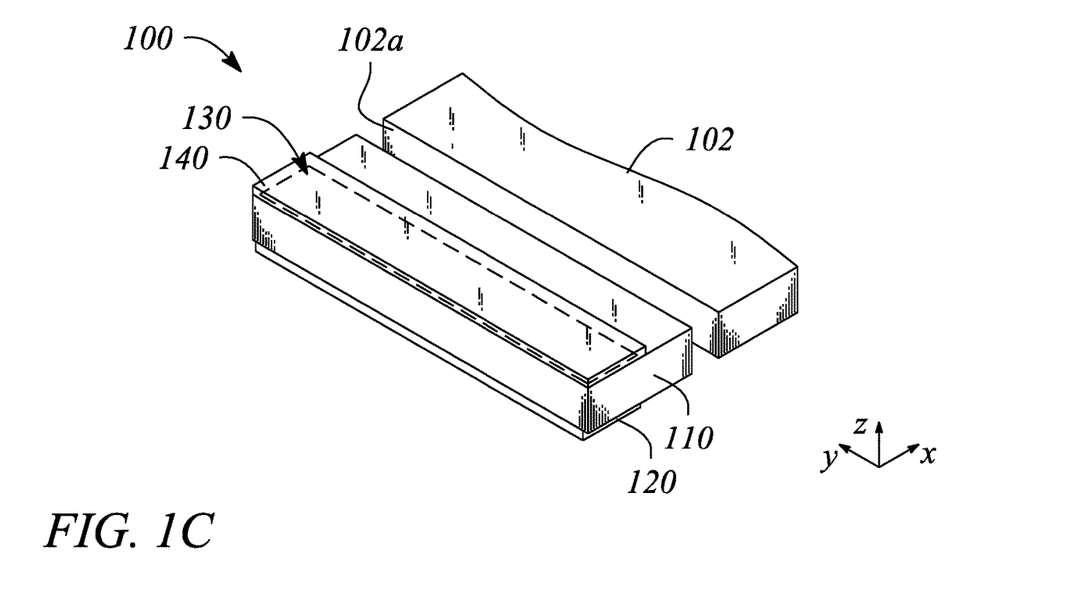
FIG. 1C illustrates a perspective view of a grating collimator in an example, according to an embodiment consistent with the principles described herein.

In accordance with principles disclosed herein, a grating collimator is provided. FIG. 1A illustrates a cross sectional view of a grating collimator 100 in an example, according to an embodiment consistent with the principles described herein. FIG. 1B illustrates a plan view of a grating collimator 100 in an example, according to an embodiment consistent with the principles described herein. FIG. 1C illustrates a perspective view of a grating collimator 100 in an example, according to an embodiment consistent with the principles described herein.

According to some embodiments, the grating collimator 100 illustrated in Figured 1A-1C is configured to serve as an illumination source of a backlight 102. In particular, the grating collimator 100 is configured to provide collimated light 104 to an input 102a of the backlight 102. Further, the provided collimated light 104 has an extent corresponding to a length of the backlight input 102a, according to various embodiments. For example, a length L of the grating collimator 100 (or at least a portion that emits the collimated light 104) may be substantially similar a length of the backlight input 102a. In some embodiments, the provided collimated light 104 is configured to be uniform or at least substantially uniform in intensity along the length of the backlight input 102a. In other embodiments, the provided collimated light 104 may have an intensity profile that varies (i.e., a non-uniform intensity profile) along the length of the backlight input 102a. For example, the intensity profile may be configured to compensate for non-ideal propagation or emission characteristics of the backlight 102.

As illustrated in FIGS. 1A-1C, the grating collimator 100 comprises a light guide 110. The light guide 110 is configured to guide light along a length of the light guide 110 as guided light 112. Further, the light guide 110 is configured to guide the guided light 112 at a non-zero propagation angle relative to a plane of a guiding surface of the light guide 110. In particular, the non-zero propagation angle may be relative to one or both of a first surface 110a and a second surface 110b of the light guide 110. In particular, the light guide 110 is configured to guide the guided light 112 using total internal reflection. For example, the light guide 110 may include an optically transparent dielectric material configured as an optical waveguide, the dielectric material having a refractive index that is greater than a refractive index of a medium surrounding the optical waveguide. A difference between refractive indices of the dielectric material and the surrounding medium is configured to facilitate total internal reflection of the guided light 112 within the grating collimator 100 according to one or more guided modes thereof. Further, the non-zero propagation angle of the guided light 112 within the light guide 110 may correspond to an angle that is less than a critical angle for total internal reflection, according to various embodiments. In FIG. 1A, propagation of the guided light 112 is illustrated as an arrow pointing along an x-direction and representing a propagating optical beam within the light guide 110 that is guided toward an output or output surface 110c of the light guide 110. Thus, according to some embodiments, the light guide 110 is configured to guide the guided light 112 according to total internal reflection between the first surface 110a and the second surface 110b and generally toward the output surface 110c of the light guide 110.

In various embodiments, the light guide 110 is or may comprise a bar-shaped, columnar optical waveguide, e.g., as illustrated in FIGS. 1A-1C. In particular, as illustrated in FIGS. 1A-1C the light guide 110 has a bar shape with a length L in a y-direction that is greater than both a width W in the x-direction and thickness H in a z-direction (i.e., L>W and L>H). In some embodiments, the width W of the light guide 110 in the propagation direction is greater than two times the thickness H of the light guide 110 divided by a tangent of the non-zero propagation angle, the thickness H being a dimension of the light guide 110 orthogonal to the width W.

According to various embodiments, the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some embodiments, the light guide 110 may further include a cladding layer on at least a portion of a surface (e.g., the top surface and/or the bottom surface) of the light guide 110 (not illustrated). The cladding layer may be used to further facilitate total internal reflection, for example.

The grating collimator 100 illustrated in FIGS. 1A-1C further comprises a light-recycling light source 120. As illustrated, the light-recycling light source 120 is disposed on a side (e.g., the second surface 110b, as illustrated) of the light guide 110 and along the light guide length L. According to some embodiments, the light-recycling light source 120 may have a length or extent that is equivalent to or commensurate with the length L of the light guide 110.

According to various embodiments, the light-recycling light source 120 is configured to emit or provide light to the light guide 110 as emitted light 120a. As illustrated, the light-recycling light source 120 provides the emitted light 120a to the second surface 110b of the light guide 110. Further, the light-recycling light source 120 is configured to recycle light 120b received from the light guide 110. For example, the light recycled by the light-recycling light source 120 may comprise the emitted light 120a that is one or both of reflected and diffracted back into the light-recycling light source 120, for example. The recycled light provided by the light-recycling light source 120 is configured to augment or add to the emitted light 120a provided by the light-recycling light source 120, according to various embodiments. That is, the recycled light may be re-emitted by the light-recycling light source 120 as a portion of the emitted light 120a.

Figure 2:
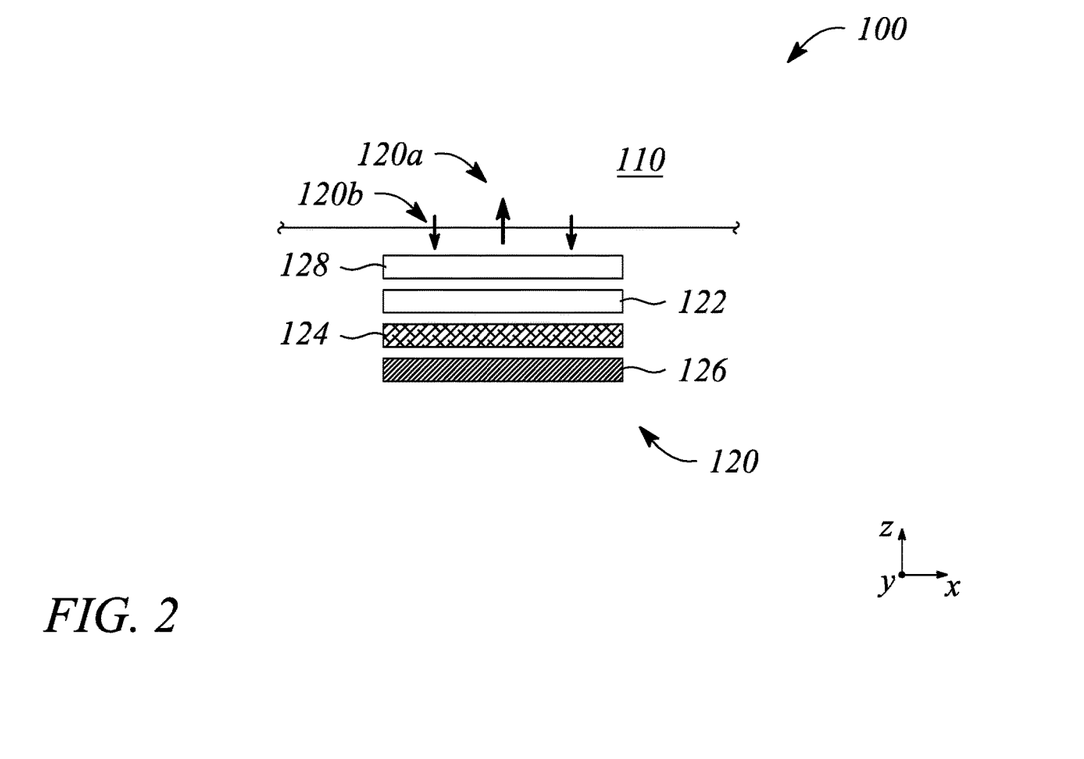
FIG. 2 illustrates a magnified side view of a light-recycling light source of a grating collimator in an example, according to an embodiment consistent with the principles described herein.

FIG. 2 illustrates a magnified side view of a light-recycling light source 120 of a grating collimator 100 in an example, according to an embodiment consistent with the principles described herein. In particular, FIG. 2 may represent a magnified side view of the light-recycling light source 120 of the grating collimator 100 depicted in FIGS. 1A and 1C. As illustrated in FIG. 2, the light-recycling light source 120 comprises an optical emitter 122. The optical emitter 122 is configured to emit light as the emitted light 120a. According to various embodiments, the optical emitter 122 may comprise any of a number of different optical emitters including, but not limited to, a laser, a light emitting diode (LED), an organic light emitting diode (OLED), polymer emitting diode, a plasma-based optical emitter, a fluorescent lamp, an incandescent lamp, an virtually any other source of light. In some embodiments, the optical emitter 122 may be configured to emit polychromatic light (e.g., white light). For example, the optical emitter 122 may comprise a white LED configured to emit white light. In another example, the optical emitter 122 configured to emit polychromatic light such as white light may comprise a plurality of different color LEDs (e.g., a red LED, a green LED, and a blue LED) that when combined provide white light as the emitted light. According to some embodiments, the optical emitter 122 may comprise an array of LEDs or similar optical emitters distributed along a length of the light-recycling light source 120 or equivalently along a length L of the light guide 110.

The light-recycling light source 120, illustrated in FIG. 2, further comprises an optical diffuser 124. The optical diffuser 124 (e.g., a diffusion film or layer) is configured to diffuse light and specifically to diffuse the light 120b received by the light-recycling light source 120. The optical diffuser 124 may also diffuse emitted light 120a emitted by the optical emitter 122, in some embodiments. The optical diffuser 124 may comprise substantially any layer or material configured to diffuse light such as, but not limited to, a transparent polymer film with one or both of embedded fine particles and a randomly scattering surface treatment. As illustrated, the optical emitter 122 is located between the optical diffuser 124 and an output of the light-recycling light source 120 adjacent to the second surface 110b of the light guide 110. Further, the optical diffuser 124 is configured to diffuse the light 120b that passes by or through the optical emitter 122. In other embodiments (not illustrated), the optical diffuser 124 may be located between the optical emitter 122 and the output of the light-recycling light source 120.

As illustrated in FIG. 2, the light-recycling light source 120 further comprises a reflector 126. The reflector 126 is configured to reflect the light diffused by the optical diffuser 124 toward the light guide 110 or equivalently toward the output of the light-recycling light source 120 as recycled light. In particular, the diffuse light reflected by the reflector 126 may be used to augment the emitted light 120a as recycled light, as described above. That is, the emitted light 120a provided to the light guide 110 at the output of the light-recycling light source 120 may comprise light emitted by the optical emitter 122 and the reflected diffuser light (or recycled light) in combination.

In some embodiments, the reflector 126 may comprise an enhanced specular reflector (ESR) layer. Examples of ESR films include, but are not limited to, Vikuiti™ Enhanced Specular Reflector Film available from 3M Optical Systems Division, St. Paul, MN. In other embodiments, the reflector 126 may include, but is not limited to, a metallized film, such as metallized Mylar, a layer or reflective metal (e.g., on a surface of the optical diffuser 124), or substantially any other optical reflector.

According to some embodiments (e.g., as illustrated in FIG. 2), the light-recycling light source 120 may further comprise a collimation layer 128. The collimation layer 128 is configured to collimate the light (e.g., the emitted light 120a) provided to the light guide 110. The collimation layer 128 may comprise a brightness enhancement film (BEF). Brightness enhancement films are available, for example, from 3M Optical Systems Division, St. Paul, MN as Vikuiti™ BEF II which are micro-replicated enhancement films that utilize a prismatic structure to provide up to a 60% brightness gain. In some embodiments, the collimation layer 128 may be configured to collimate the light provided to the light guide 110 according to a predetermined cone angle of less than about thirty (30) degrees.

Referring again to FIGS. 1A-1C, the grating collimator 100 further comprises a diffraction grating coupler 130. According to some embodiments, the diffraction grating coupler 130 is located at the guiding surface of the light guide 110, i.e., one or both of the first and second surfaces 110a, 110b. That is, in some embodiments the diffraction grating coupler 130 may be located on the first surface 110a of the light guide 110 opposite to the second surface 110b adjacent to the light-recycling light source 120, as illustrated. In other embodiments, the diffraction grating coupler 130 may be located on the second surface 110b of the light guide 110. In yet other embodiments, the diffraction grating coupler 130 may be located between the guiding surfaces and within the light guide 110.

The diffraction grating coupler 130 is configured to diffractively redirect the light (e.g., emitted light 120a) provided by the light-recycling light source 120 into the light guide 110 toward the output surface 110c as the guided light 112. Further, the diffraction grating coupler 130 is configured to redirect the light at the non-zero propagation angle, according to some embodiments.

In some embodiments, the diffraction grating coupler 130 is a transmissive grating coupler comprising a transmission mode diffraction grating. The transmission mode diffraction grating is configured to diffractively redirect light using transmissive diffraction. The diffraction grating coupler 130 as a transmissive grating coupler may be located at a guiding surface adjacent to the light-recycling light source 120, e.g., the second surface 110b. In other embodiments, the diffraction grating coupler 130 is a reflective grating coupler comprising a reflection mode diffraction grating. The reflection mode diffraction grating is configured to diffractively redirect light using reflective diffraction. The diffraction grating coupler 130 as a reflective grating coupler may be located at a guiding surface opposite to the guiding surface adjacent to the light-recycling light source 120, e.g., the first surface 110a.

Figure 3A:
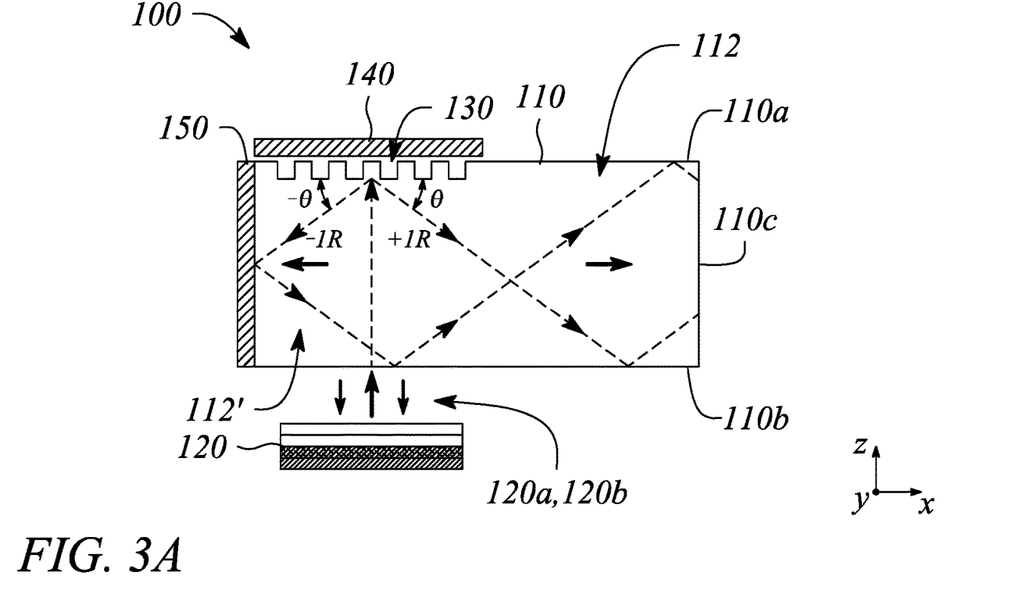
FIG. 3A illustrates a cross sectional view of a grating collimator in an example, according to an embodiment consistent with the principles described herein.

FIG. 3A illustrates a cross sectional view of a grating collimator 100 in an example, according to an embodiment consistent with the principles described herein. In particular, the grating collimator 100 in FIG. 3A has a diffraction grating coupler 130 that is a reflective grating coupler located on the first surface 110a of the light guide 110 opposite to the light-recycling light source 120. As illustrated, emitted light 120a from the light-recycling light source 120 enters the grating coupler and may be diffractively redirected by reflective diffraction into the light guide 110 as the guided light 112 at the non-zero propagation angle θ and toward the output surface 110c of the light guide 110. The guided light 112 may be the result of positive, first order diffraction (+1R), for example.

Figure 3B:
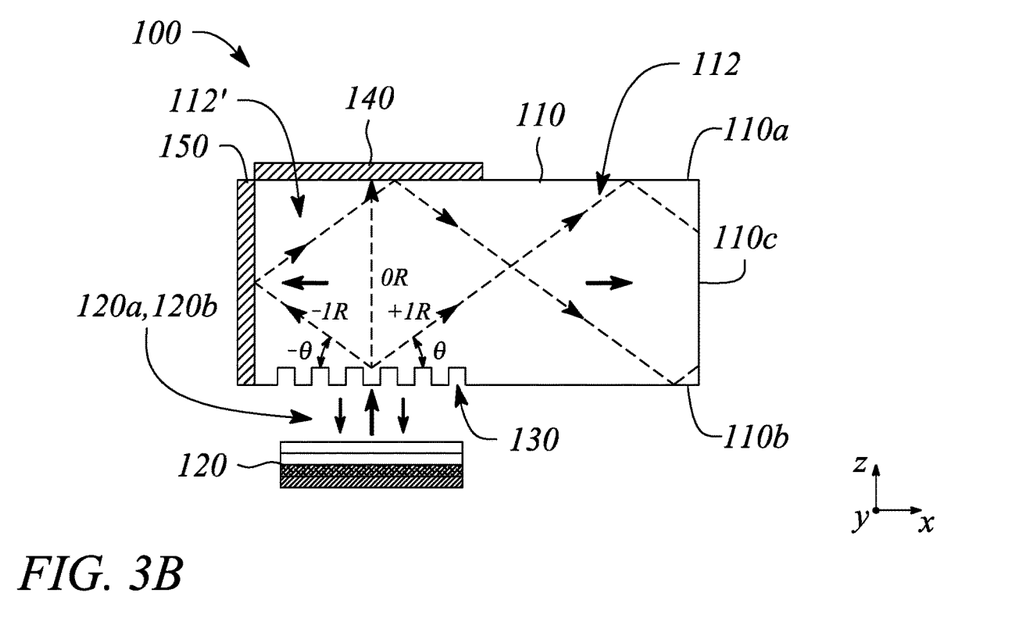
FIG. 3B illustrates a cross sectional view of a grating collimator in an example, according to another embodiment consistent with the principles described herein.

FIG. 3B illustrates a cross sectional view of a grating collimator 100 in an example, according to another embodiment consistent with the principles described herein. In particular, the grating collimator 100 in FIG. 3A has a diffraction grating coupler 130 that is a transmissive grating coupler located on the second surface 110b of the light guide 110 adjacent to the light-recycling light source 120. As illustrated, emitted light 120a from the light-recycling light source 120 enters the grating coupler and may be diffractively redirected by transmissive diffraction into the light guide 110 as the guided light 104 at the non-zero propagation angle θ and toward the output surface 110c of the light guide 110. The guided light 104 may be the result of positive, first order diffraction (+1R), for example.

In some examples (e.g., as illustrated in FIGS. 3A-3B), negative, first order diffraction (−1R) by the diffraction grating coupler 130 may result in diffractively redirected light 104' that propagates in a negative direction away from the output surface 110c. The diffractively redirected light 104' may have a negative non-zero propagation angle −θ, for example. The diffractively redirected light 112' that propagates in the negative direction away from the output surface 110c may encounter and be reflected by a surface of the light guide 110 opposite to the output surface 110c. After being reflected, the diffractively redirected light 112' may be redirected toward the output surface 110c as a portion of the guided light 112, as illustrated by extended arrows in FIGS. 3A-3B. Further, a zero order diffraction component (illustrated in FIG. 3B as '0R', but not illustrated FIG. 3A for ease of illustration) may be redirected back to the light-recycling light source 120 for recycling, e.g., by reflection. Further, light that is diffractively redirected at an angle that is more acute than a critical angle of the light guide 110 may also re-enter the light-recycling light source 120 and be recycled, in some examples. FIGS. 3A and 3B also illustrate both the emitted light 120a from the light-recycling light source 120 and the light 120b (e.g., due 0R diffraction, etc.) received by the light-recycling light source 120 from the light guide 110.

Referring again to FIG. 1A along with FIGS. 3A-3B, the grating collimator 100 may further comprise a top reflective layer 140 on a surface (e.g., the first surface 110a) of the grating collimator 100 opposite to the light-recycling light source 120. The top reflective layer 140 is configured to facilitate reflection by the diffraction grating coupler 130. In particular, when the diffraction grating coupler 130 is a reflective grating coupler as illustrated in FIGS. 1A and 3B, the top reflective layer 140 may assist in the reflective diffraction by the reflective grating coupler. Further, the grating collimate 100 may comprise a side reflective layer 150 on a surface of the light guide 110 opposite to the output surface 110c of the grating collimator 100. The side reflective layer 150 is configured to light back toward the output surface 110c of the light guide 110, e.g., as illustrated. For example, the side reflective layer 150 may be configured to reflect the diffractively redirected light 104' that propagates in a negative direction back toward the output surface 110c.

According to some embodiments, one or both of the top reflective layer 140 and the side reflective layer 150 may comprise an enhanced specular reflector (ESR) layer such as, but not limited to, the Vikuiti™ Enhanced Specular Reflector Film. In other embodiments, one or both of the top reflective layer 140 and the side reflective layer 150 may comprise a reflective metal layer or film, e.g., a reflective metal film deposited on the respective surface(s) of the light guide 110.

Figure 4:
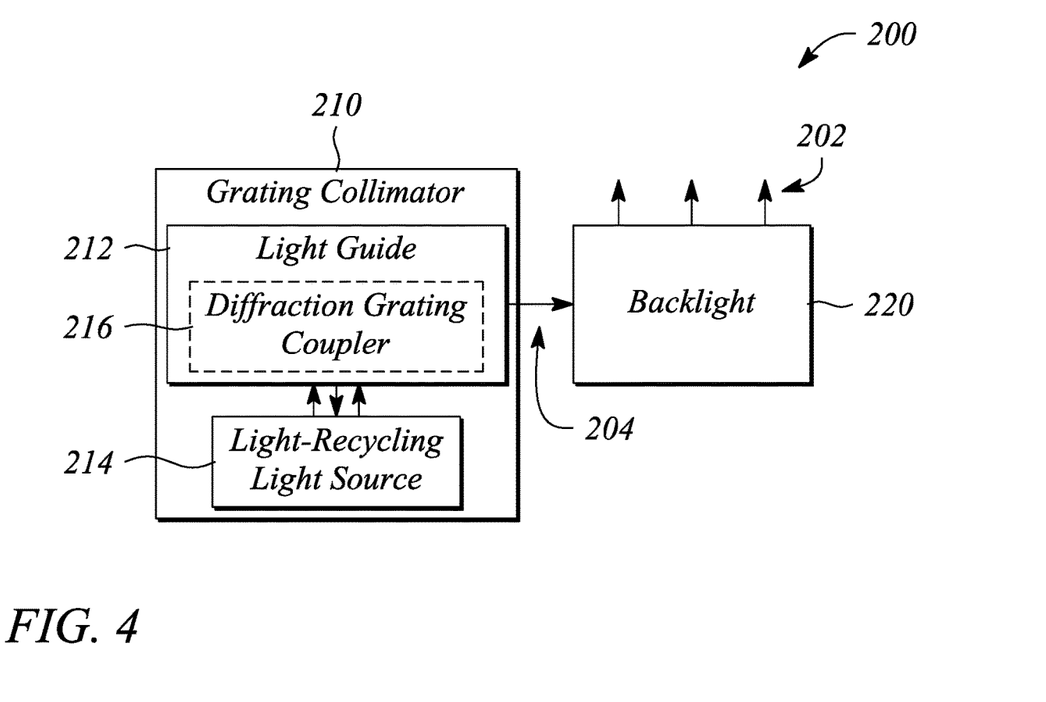
FIG. 4 illustrates a block diagram of a backlight system in an example, according to an embodiment consistent with the principles described herein.

In accordance with other embodiments of the principles described herein, a backlight system 200 is provided. FIG. 4 illustrates a block diagram of a backlight system 200 in an example, according to an embodiment consistent with the principles described herein. The backlight system 200 may be configured to provide illumination in the form of emitted light 202 that is useful in various display applications. For example, the backlight system 200 may provide diffuse illumination as emitted light 202 that may be consistent with displaying an image with a broad viewing angle (e.g., a 2D image). In particular, the displayed image may be configured to provide the same view of the displayed image to a viewer substantially anywhere within the broad viewing angle. In other examples, the backlight system 200 may be configured to provide directional illumination (e.g., a light field) as the emitted light 202. The emitted light 202 representing the directional illumination may be consistent with displaying a multiview image, for example. In these examples, the emitted light 202 may comprise a plurality of directional light beams having different principle angular directions corresponding to different view directions associated with the displayed multiview image.

As illustrated in FIG. 4, the backlight system 200 comprises a grating collimator 210 and a backlight 220. The grating collimator 210 is configured to provide collimated light 204 as an output (i.e., as output light). The backlight 220 is configured to receive the collimated light 204 at an input of the backlight adjacent to the grating collimator 210. Further, the backlight 220 is configured to provide the emitted light 202 from or using the collimated light 204. According to various embodiments, the backlight 220 or more specifically the input of the backlight 220 has an extent corresponding to a length of the grating collimator 210.

The grating collimator 210 illustrated in FIG. 4 comprises a light guide 212. The light guide 212 is configured to guide light as guided light toward an output of the grating collimator 210, e.g., adjacent to the backlight 220. The grating collimator 210 further comprises a light-recycling light source 214 configured to provide light to the light guide 212. The light-recycling light source 214 is further configured to recycle light received from the light guide 212, the recycled light augmenting the light provided to the light guide 212. The grating collimator 210 further comprises a diffraction grating coupler 216 located at a guiding surface of the light guide 212. The diffraction grating coupler 216 is configured to diffractively redirect the light provided by the light-recycling light source 214 into the light guide 212 as the guided light to provide collimated light 204 at the grating collimator output.

In some embodiments, the grating collimator 210 may be substantially similar to the grating collimator 100 described above. In particular, the light guide 212 may be substantially similar to the light guide 110 of the above-described grating collimator 100, in some embodiments. For example, the light guide 212 may be configured to guide the guided light at a non-zero propagation angle relative to a plane of a guiding surface of the light guide 212. Further, the light guide 212 may comprise a bar-shaped, columnar optical waveguide having a side along a length of the light guide 212 that corresponds to the grating collimator output.

Further, in some embodiments, the light-recycling light source 214 may be substantially similar to the light-recycling light source 120, described above with respect to the grating collimator 100. In particular, the light-recycling light source 214 may comprise an optical emitter configured to emit light, an optical diffuser configured to diffuse light received from the light guide, a reflector configured to reflect light diffused by the optical diffuser in a direction toward the light guide 212 as the recycled light. Each of the optical emitter, the optical diffuser and the reflector may be substantially similar respectively to the optical emitter 122, the optical diffuser 124, and the reflector 126, as described above with respect to the light-recycling light source 120. In some embodiments, the light-recycling light source 214 may further comprise a collimation layer configured to collimate the light provided to the light guide 212. In some embodiment, the collimation layer may be substantially similar to the collimation layer 128 of the above described light-recycling light source 120. According to various embodiments, the light provided to the light guide 212 comprises both of the light emitted by the optical emitter and the recycled light.

In some embodiments, the diffraction grating coupler 216 may be substantially similar to the diffraction grating coupler 130 of the above-described grating collimator 100. In particular, the diffraction grating coupler 216 may comprise either a transmissive grating coupler or a reflective grating coupler. The transmissive grating coupler may be located at the guiding surface of the light guide 212 adjacent to the light-recycling light source 214 and the reflective grating coupler may be located at the guiding surface of the light guide 212 opposite to the guiding surface adjacent to the light-recycling light source 214, according to various embodiments.

Further, in some embodiments (not illustrated), the grating collimator 210 further comprises one or both of a first reflective layer and a second reflective layer. The first reflective layer and the second reflector layer may be substantially similar respectively to the top reflective layer 140 and the side reflective layer 150 of the grating collimator 100, in some embodiments. In particular, the first reflective layer may be located adjacent a surface of the light guide 212 opposite to the light-recycling light source 214 to facilitate reflection by the diffraction grating coupler 216 comprising the reflective grating coupler. Similarly, the second reflective layer may be on a surface of the light guide 212 opposite to the output of the grating collimator 210 to assist in reflecting light from the diffraction grating coupler 216 that is diffractively redirected away from the output of the grating collimator 210, where the diffraction grating coupler comprises one or both of the transmissive grating coupler and the reflective grating coupler.

According to some embodiments, the backlight 220 of the backlight system 200 may comprise a backlight light guide configured to guide the collimated light 204 received from the grating collimator 210. In turn, the illuminated backlight 220 is configured to provide the emitted light 202 using the received collimated light 204. According to various embodiments, the grating collimator 210 is adjacent to an input end of the backlight 220.

In some embodiments (not illustrated), the backlight 220 comprises a scattering feature (not illustrated) configured to provide diffuse or substantially non-directional emitted light 202. In particular, the scattering feature may comprise a plurality of scattering elements spaced apart from one another across a surface of the backlight 220. The scattering elements may be optically coupled to a light guide of the backlight 220 to scatter out light from the light guide as the diffuse or substantially non-directional emitted light 202, for example. In some embodiments, a size of a scattering element of the scattering element plurality may be less than or equal to a size of a light valve of the light valve array of a display that employs the backlight 220 as source of illumination. The diffuse or substantially non-directional emitted light 202 may have an angular spread or beamwidth consistent with displaying an image with a broad viewing angle (e.g., a 2D image), for example.

Figure 5A:
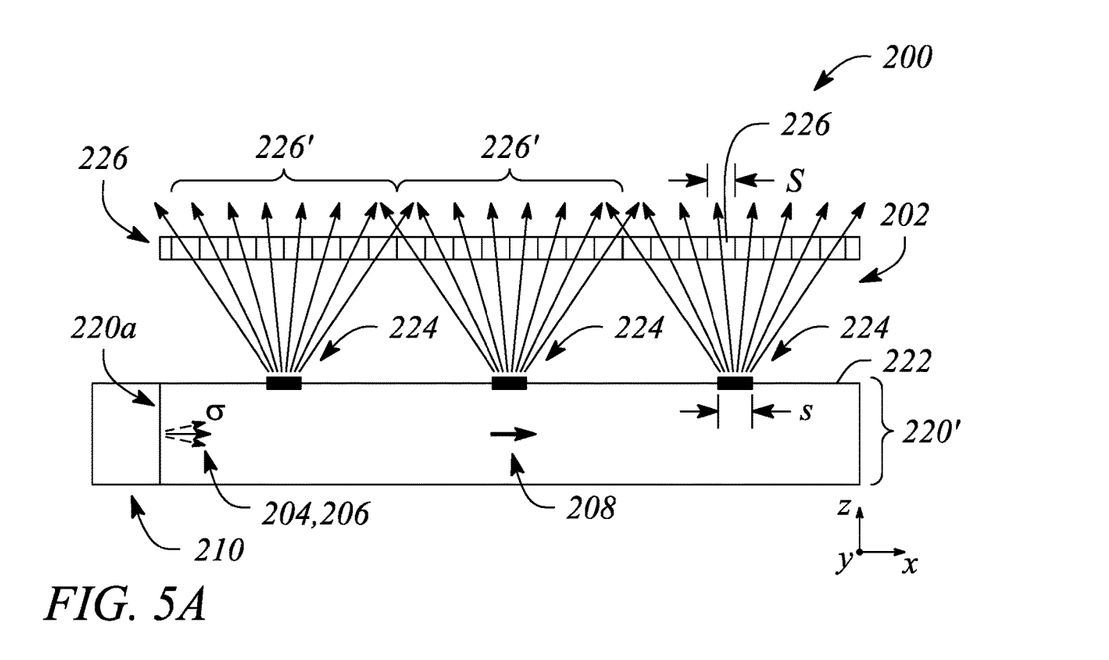
FIG. 5A illustrates a side view of a backlight system comprising a multiview backlight in an example, according to an embodiment consistent with the principles described herein.
Figure 5B:
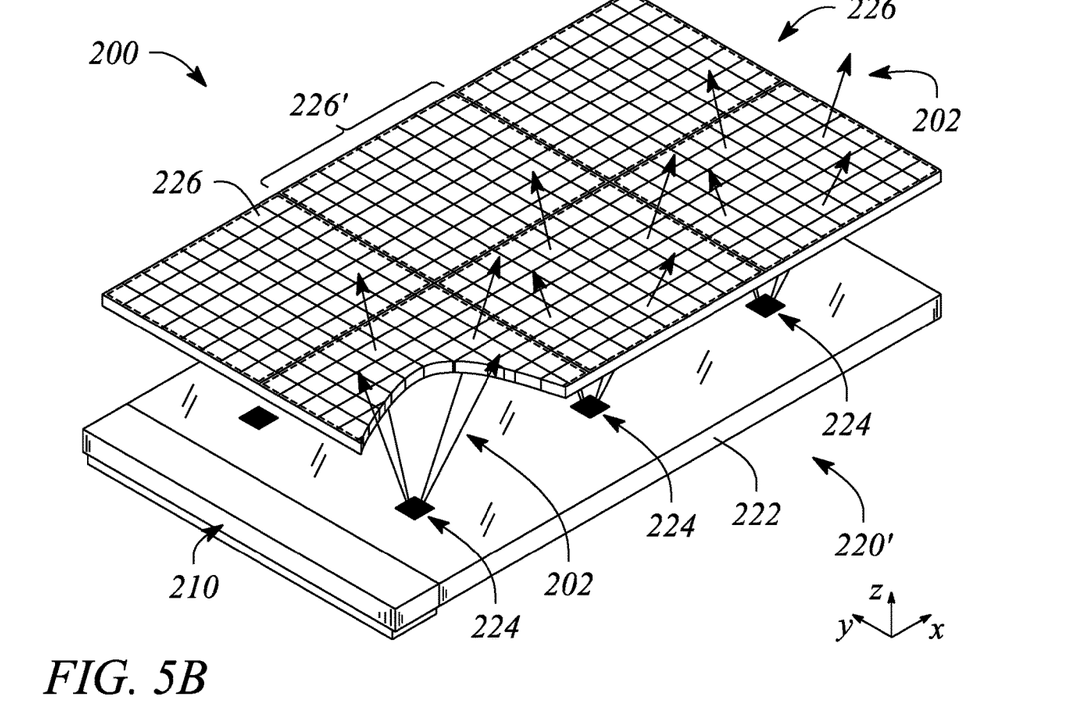
FIG. 5B illustrates a perspective view of the backlight system of FIG. 5A in an example, according to an embodiment consistent with the principles described herein.

In other embodiments, backlight 220 of the backlight system 200 is a multiview backlight 220'. The multiview backlight 220' is configured to provide emitted light 202 that is directional. In particular, the directional emitted light 202 comprises a directional light beams having different principal angular directions from one another. Further, the different principal angular directions of the directional light beams correspond to respective different view directions of a multiview display or equivalently of a multiview image displayed by the multiview display. FIG. 5A illustrates a side view of a backlight system 200 comprising a multiview backlight 220' in an example, according to an embodiment consistent with the principles described herein. FIG. 5B illustrates a perspective view of the backlight system 200 of FIG. 5A in an example, according to an embodiment consistent with the principles described herein.

As illustrated in FIGS. 5A-5B, the backlight system 200 comprises a grating collimator 210 and the backlight 220 implemented as a multiview backlight 220'. The grating collimator 210 is described above. The grating collimator 210 is configured to provide collimated light 204 to the input end 220a of the multiview backlight 220'. Note that, while only a single grating collimator 210 is illustrated, a pair of grating collimators 210 at opposite ends of the multiview backlight 220' may be employed in some embodiments.

The multiview backlight 220' illustrated in FIGS. 5A-5B comprises a backlight light guide 222. The backlight light guide 222 is configured to receive the extracted light as the collimated light 204 and to guide the received collimated light 204 as guided collimated light 206. FIG. 5A illustrates a general propagation direction 208 of the guided collimated light 206 using a bold arrow. In addition, the guided collimated light 206 has the collimation factor σ, as illustrated.

As illustrated in FIGS. 5A-5B, the multiview backlight 220' further comprises a plurality of multibeam elements 224 spaced apart from one another along a length of the backlight light guide 222. A multibeam element 224 of the plurality of multibeam elements 224 is configured to scatter out from the backlight light guide 222 a portion of the guided collimated light 206 as the emitted light 202 comprising a plurality of directional light beams. Directional light beams of the emitted light 202, represented by diverging arrows in FIGS. 5A-5B, have different principal angular directions from one another. Moreover, the different principal angular directions of the plurality of directional light beams correspond to respective different view directions of a multiview display that includes the multiview backlight 220', according to various embodiments.

In some embodiments, a size s of the multibeam element 224 is between about fifty percent and about two hundred percent of a size S of a light valve 226 of a multiview display that employs the multiview backlight 220' as source of illumination. FIGS. 5A-5B illustrate an example array of light valves 226. As illustrated, each multibeam element 224 is configured to provide directional light beams of the emitted light 202 to one and only one set 226' of light valves 226, each set 226' corresponding to multiview pixel. As such, for a given one of the multibeam elements 224, the directional light beams having different principal angular directions corresponding to the different views of the multiview display are substantially confined to a single corresponding multiview pixel or equivalently to a single set of light valves 226 corresponding to the multibeam element 224, e.g., as illustrated in FIG. 5A. As such, each multibeam element 224 of the multiview backlight 220' provides a corresponding set of directional light beams of the emitted light 202 that has a set of the different principal angular directions corresponding to the different views of the multiview display (i.e., the set of directional light beams contains a light beam having a direction corresponding to each of the different view directions).

According to various embodiments, the multibeam element 224 of the multibeam element plurality may comprise any of a number of different structures configured to couple out a portion of the guided collimated light 206. For example, the different structures may include, but are not limited to, diffraction gratings, micro-reflective elements, micro-refractive elements, or various combinations thereof. In some embodiments, the multibeam element 224 comprising a diffraction grating is configured to diffractively couple out the guided light portion as the plurality of directional light beams of the emitted light 202 having the different principal angular directions. In other embodiments, the multibeam element 224 comprising a micro-reflective element is configured to reflectively couple out the guided light portion as the plurality of directional light beams, or the multibeam element 224 comprising a micro-refractive element is configured to couple out the guided light portion as the plurality of directional light beams of the emitted light 202 by or using refraction (i.e., refractively couple out the guided light portion).

Figure 6:
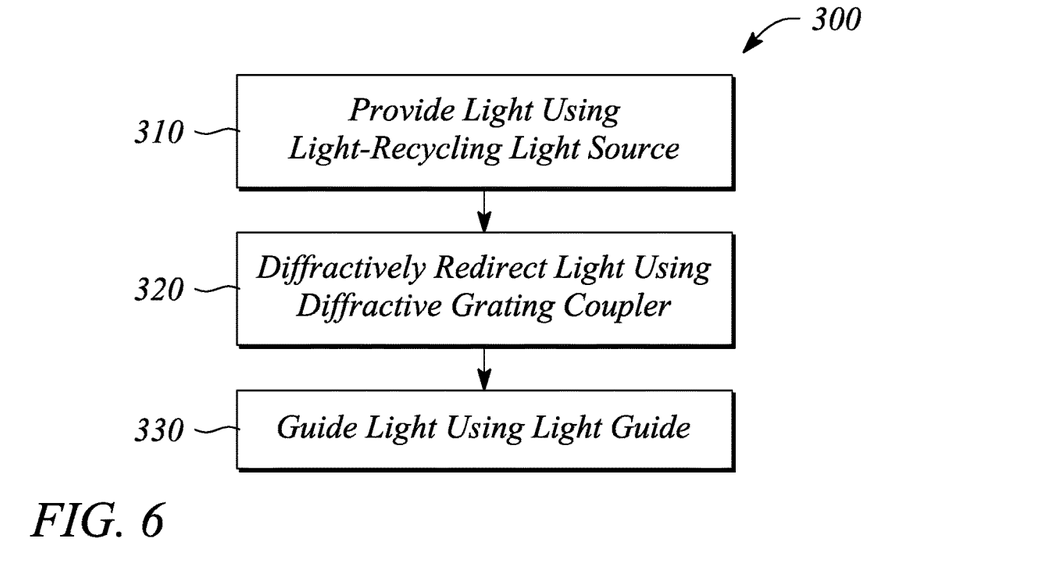
FIG. 6 illustrates a flow chart of a method of collimating light in an example, according to an embodiment consistent with the principals described herein.

In accordance with other embodiments of the principles described herein, a method of collimating light is provided. The method of collimating light may be employed to provide collimated output light used to illuminate a backlight, for example. FIG. 6 illustrates a flow chart of a method 300 of collimating light in an example, according to an embodiment consistent with the principals described herein.

As illustrated, the method 300 of collimating light comprises providing 310 light to a light guide using a light-recycling light source. In various embodiments, the provided 310 light comprises both recycled light and emitted light of the light-recycling light source, according to various embodiments. The recycled light comprises light received from the light guide by the light-recycling light source that is redirected back toward the light guide to augment the emitted light, according to various embodiments.

In some embodiments, the light re-cycling light source may be substantially similar respectively to the light-recycling light source 120 of the grating coupler 100, as described above. In particular, in some embodiments, providing 310 light to the light guide may comprise emitting light using an optical emitter to provide the emitted light. Further providing 310 may comprise diffusing and reflecting the light received from the light guide using an optical diffuser and a reflector to redirect the light received back to the light guide as the recycled light, according to some embodiments.

The method 300 of collimating light illustrated in FIG. 6 further comprises diffractively redirecting 320 the light provided to the light guide using a diffraction grating coupler at a guiding surface of the light guide. According to various embodiments, the diffractively redirected light is directed into the light guide at a non-zero propagation angle as guided light. In some embodiments, the diffraction grating coupler may be substantially similar to the diffraction grating coupler 130 described above with respect to the grating collimator 100.

The illustrated method 300 of collimating light of FIG. 6 further comprises guiding 330 the guided light using the light guide toward an output of the grating collimator to provide collimated output light. In some embodiments, the light guide is substantially similar to the light guide 110 of the grating collimator 100, as described above. For example, the light guide may guide 330 the guided light between a pair of guiding surfaces of the light guide using total internal reflection. Further, the light guide may be bar shaped. Further, the bar-shaped light guide may have a width in a propagation direction of the guided light that is greater than two times a thickness of the light guide 110 divided by a tangent of the non-zero propagation angle, the thickness being a dimension of the light guide orthogonal to the width.

In some embodiments (not illustrated), the method 300 of collimating light further comprises collimating the light provided to the light guide by the light-recycling light source using a collimation layer. The collimation layer may be substantially similar to the collimation layer 128 of the light-recycling light source 120 described with respect to the grating collimator 100. In some embodiments (not illustrated), the method 300 of collimating light further comprises directing the collimated output light from the output of the grating collimator into an input of a backlight, the grating collimator being adjacent to the backlight input. The collimated output light that is directed into the backlight input may serve to illuminate the backlight, according to various embodiments.

In some embodiments, the backlight is a multiview backlight. In these embodiments (not illustrated), the method 300 of collimating light further comprises guiding the collimated light in a light guide of the backlight, the collimated light being received by the backlight light guide at the backlight input. Further, in these embodiments (not illustrated), the method 300 of collimating light further comprises providing emitted light comprising a plurality of directional light beams by scattering out a portion of the guided collimated light using a multibeam element of the multiview backlight. The plurality of directional light beams have different principal angular directions corresponding to respective different view directions of a multiview display, according to various embodiments.

Thus, there have been described examples and embodiments of a grating collimator, a backlight system including a grating collimator, and a method of collimating light that include a light-recycling light source. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A grating collimator comprising:
a light guide configured to guide light as guided light at a non-zero propagation angle relative to a plane of a guiding surface of the light guide, the guided light having a propagation direction toward an output of the grating collimator;
a light-recycling light source configured to provide light to the light guide and to recycle light received from the light guide, the light recycled by the light-recycling light source being configured to augment the provided light; and
a diffraction grating coupler at the guiding surface of the light guide, the diffraction grating coupler being configured to diffractively redirect the light provided by the light-recycling light source into the light guide as the guided light at the non-zero propagation angle,
wherein the light-recycling light source comprises an optical emitter configured to emit light, an optical diffuser configured to diffuse light received from the light guide, and an optical reflector configured to reflect light diffused by the optical diffuser in a direction toward the light guide as reflected diffuse light, the light emitted by the optical emitter and the reflected diffuse light being provided in combination as the light provided to the light guide.

2. The grating collimator of claim 1, wherein the light-recycling light source further comprises a collimation layer configured to collimate the light provided to the light guide.

3. The grating collimator of claim 2, wherein the collimation layer is configured to collimate the light provided to the light guide according to a predetermined cone angle of less than about thirty (30) degrees.

4. The grating collimator of claim 1, wherein the diffraction grating coupler is a transmissive grating coupler comprising a transmission mode diffraction grating configured to diffractively redirect light using transmissive diffraction and the guiding surface at which the diffraction grating coupler is located is adjacent to the light-recycling light source.

5. The grating collimator of claim 1, wherein the diffraction grating coupler is a reflective grating coupler comprising a reflection mode diffraction grating configured to diffractively redirect light using reflective diffraction and the guiding surface at which the diffraction grating coupler is located is opposite to the light-recycling light source.

6. The grating collimator of claim 1, further comprising at least one of a top reflective layer on a surface of the grating collimator opposite to the light-recycling light source and configured to facilitate reflection by the diffraction grating coupler and a side reflective layer on a surface of the light guide opposite to the output of the grating collimator.

7. The grating collimator of claim 6, wherein the diffraction grating coupler is further configured to diffractively redirect light in a direction opposite to the direction of guided light and toward the side reflective layer, the side reflective layer being configured to assist in reflecting the diffractively redirected light back toward the output of the light guide.

8. The grating collimator of claim 1 wherein a width of the light guide in the propagation direction is greater than two times a thickness of the light guide divided by a tangent of the non-zero propagation angle, the thickness being a dimension of the light guide orthogonal to the width.

9. A multiview backlight system comprising the grating collimator of claim 1, the multiview backlight system further comprising:
a backlight light guide configured to receive collimated light from the grating collimator at an input of the backlight and to guide the received collimated light as guided collimated light; and
a plurality of multibeam elements spaced apart from one another along a length of the backlight light guide, a multibeam element of the plurality of multibeam elements being configured to scatter out from the backlight light guide a portion of the guided collimated light as a plurality of directional light beams having different principal angular directions corresponding to respective different view directions of a multiview display.

10. A backlight system comprising:
a grating collimator comprising:
a light guide configured to guide light as guided light toward an output of the grating collimator,
a light-recycling light source configured to provide light to the light guide and recycle light received from the light guide, and
a diffraction grating coupler located at a guiding surface of the light guide and configured to diffractively redirect the light provided by the light-recycling light source into the light guide as the guided light to provide collimated output light at the grating collimator output; and
a backlight configured to receive the collimated output light at an input of the backlight adjacent to the grating collimator and having an extent corresponding to a length of the grating collimator,
wherein the light-recycling light source comprises an optical emitter configured to emit light, an optical diffuser configured to diffuse light received from the light guide, a reflector configured to reflect light diffused by the optical diffuser in a direction toward the light guide as recycled light, and a collimation layer configured to collimate the light provided to the light guide, the provided light comprising both of the light emitted by the optical emitter and the recycled light.

11. The backlight system of claim 10, wherein the diffraction grating coupler comprises either a transmissive grating coupler or a reflective grating coupler, the transmissive grating coupler being located at the guiding surface of the light guide adjacent to the light-recycling light source and the reflective grating coupler being located at the guiding surface of the light guide opposite to the guiding surface adjacent to the light-recycling light source.

12. The backlight system of claim 11, further comprising one or both of a first reflective layer and a second reflective layer, the first reflective layer being adjacent a surface of the light guide opposite to the light-recycling light source to facilitate reflection by the diffraction grating coupler comprising the reflective grating coupler, and the second reflective layer being on a surface of the light guide opposite to the output of the grating collimator to assist in reflecting light from the diffraction grating coupler that is diffractively redirected away from the output of the grating collimator.

13. The backlight system of claim 10, wherein the backlight comprises a backlight light guide configured to guide the collimated output light received from the grating collimator as guided collimated light, the guided collimated light being configured to serve as an illumination source of the backlight.

14. The backlight system of claim 13, wherein the backlight is a multiview backlight and further comprises a plurality of multibeam elements spaced apart from one another along a length of the backlight light guide, a multibeam element of the plurality of multibeam elements being configured to scatter out from the backlight light guide a portion of the guided collimated light as a plurality of directional light beams having different principal angular directions corresponding to respective different view directions of a multiview display that includes the multiview backlight.

15. A method of collimating light, the method comprising:
providing light to a light guide using a light-recycling light source, the light comprising both recycled light and emitted light of the light-recycling light source;
diffractively redirecting the light provided to the light guide using a diffraction grating coupler at a guiding surface of the light guide, the diffractively redirected light being directed into the light guide at a non-zero propagation angle as guided light; and
guiding the guided light using the light guide toward an output of the light guide to provide collimated output light,
wherein the recycled light comprises light received from the light guide by the light-recycling light source that is redirected back toward the light guide to augment the emitted light, and
wherein providing light to the light guide comprises:
emitting light using an optical emitter to provide the emitted light; and
diffusing and reflecting the light received from the light guide using an optical diffuser and a reflector to redirect the light received back to the light guide as the recycled light.

16. The method of collimating light of claim 15, further comprising collimating the light provided to the light guide by the light-recycling light source using a collimation layer.

17. The method of collimating light of claim 15, further comprising directing the collimated output light from the output of the light guide into an input of a backlight, the light guide being adjacent to the backlight input, wherein the collimated output light that is directed into the backlight input serves to illuminate the backlight.

* * * * *